(12) United States Patent
Wallace et al.

(10) Patent No.: US 9,557,911 B2
(45) Date of Patent: Jan. 31, 2017

(54) TOUCH SENSITIVE CONTROL

(71) Applicant: Lenovo (Singapore) Pte. Ltd., Singapore (SG)

(72) Inventors: Brian William Wallace, Wake Forest, NC (US); Vincent Charles Conzola, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 69 days.

(21) Appl. No.: 14/164,473

(22) Filed: Jan. 27, 2014

(65) Prior Publication Data

US 2015/0212639 A1   Jul. 30, 2015

(51) Int. Cl.
*G06F 3/0483* (2013.01)
*G06F 3/0488* (2013.01)
*G06F 1/16* (2006.01)

(52) U.S. Cl.
CPC ......... *G06F 3/04883* (2013.01); *G06F 1/1605* (2013.01); *G06F 2200/1631* (2013.01)

(58) Field of Classification Search
CPC ...... G06F 3/041; G06F 1/1652; G06F 1/1643; G06F 1/1637; G06F 3/0488; H04M 1/0268; G09G 3/3225; G02F 1/133308; G02F 1/13338
See application file for complete search history.

(56) References Cited

U.S. PATENT DOCUMENTS

| | | | |
|---|---|---|---|
| 8,723,824 B2 * | 5/2014 | Myers | H04M 1/0268 345/173 |
| 2006/0238517 A1 * | 10/2006 | King et al. | 345/173 |
| 2013/0076649 A1 * | 3/2013 | Myers | H04M 1/0268 345/173 |
| 2013/0127754 A1 * | 5/2013 | Kwon et al. | 345/173 |
| 2014/0168135 A1 * | 6/2014 | Saukko et al. | 345/174 |

\* cited by examiner

*Primary Examiner* — Kevin M Nguyen
(74) *Attorney, Agent, or Firm* — Ference & Associates LLC

(57) ABSTRACT

An aspect provides a method, including: activating, using a processor, a touch sensitive surface which comprises at least a bezel portion of a display; accepting, using a processor, user input to the bezel portion of the touch sensitive surface; and controlling, using a processor, an information handling device operatively coupled to the touch sensitive surface in response to touch input in the bezel portion of a display. Other aspects are described and claimed.

20 Claims, 4 Drawing Sheets

TOUCH SENSITIVE CONTROL

BACKGROUND

Information handling devices ("devices") come in a variety of forms, for example desktop or laptop computing devices, tablet computing devices, smart phones, and the like. Device users are increasingly desirous of relying on touch sensitive surfaces, e.g., a touch screen, to provide inputs, e.g., controlling inputs such as scrolling, or content inputs, such as providing handwriting inputs, etc. to control operations of the device, including multi-media functions of the device.

BRIEF SUMMARY

In summary, one aspect provides a method, comprising: activating, using a processor, a touch sensitive surface which comprises at least a bezel portion of a display; accepting, using a processor, user input to the bezel portion of the touch sensitive surface; and controlling, using a processor, an information handling device operatively coupled to the touch sensitive surface in response to touch input in the bezel portion of a display.

Another aspect provides an information handling device, comprising: one or more hardware devices; a touch sensitive surface which comprises at least a bezel portion of a display; a processor operatively coupled to the touch sensitive surface; and a memory device that stores instructions accessible to the processor, the instructions being executable by the processor to: activate the touch sensitive surface; accept user input to the bezel portion of the display; and control at least one of the one or more hardware devices of the information handling device in response to user input in the bezel portion of a display.

A further aspect provides a product, comprising: a storage device having code stored therewith, the code being executable by a processor and comprising: code that activates a touch sensitive surface of an information handling device which comprises at least a bezel portion of a display; code that accepts user input to the bezel portion of the display; and code that controls at least one of the one or more hardware devices of the information handling device in response to user input in the bezel portion of the display.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
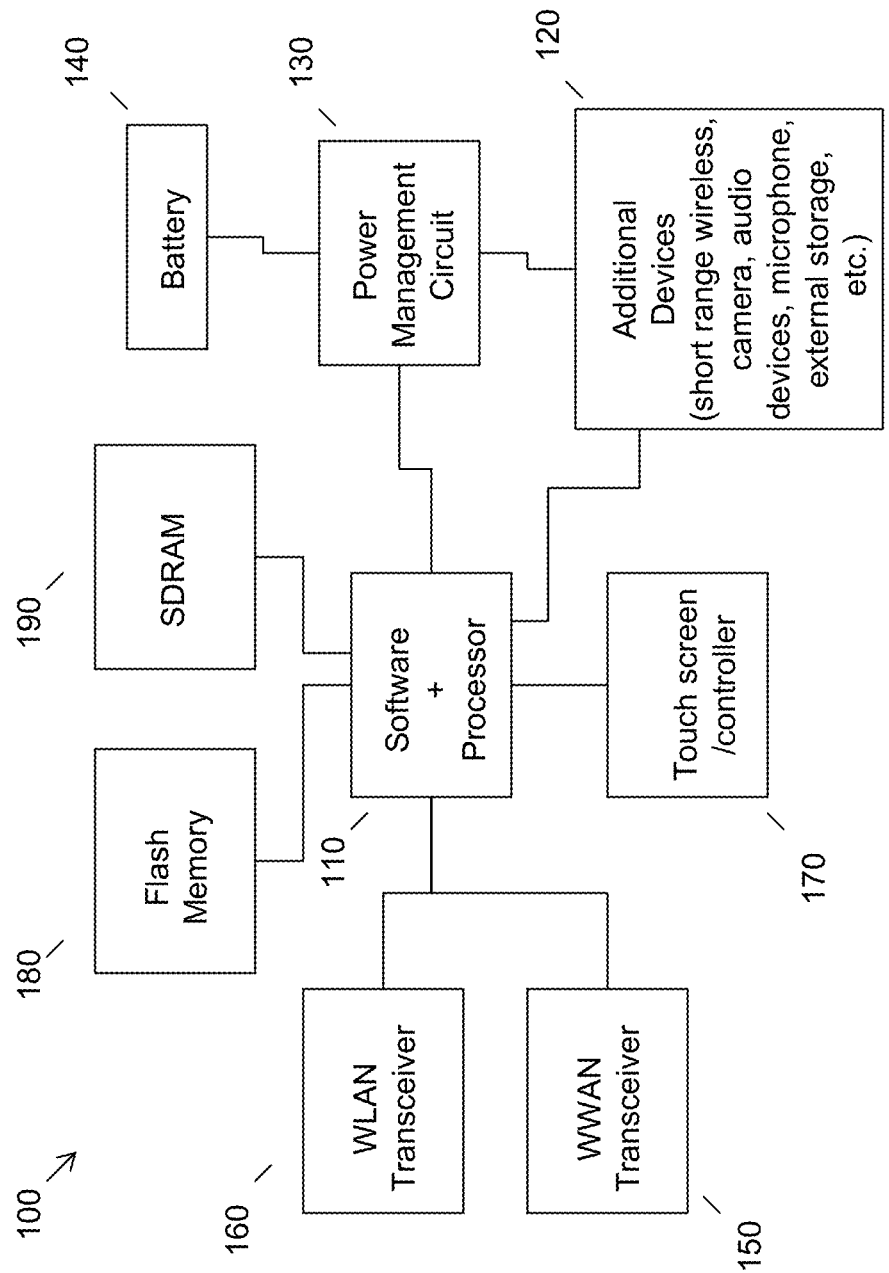
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

When using a touch screen device one problem that sometimes occurs is inadvertent touches are registered, e.g., when the user accidentally makes contact with the screen in an area he or she did not intend to touch. This often happens when using a stylus or finger to draw on the screen and the palm of the hand rests on the touch screen. With newer multi-touch touch screens this also occurs is when multiple people are sharing a large screen device and one user accidentally touches the screen when a different user is trying to accomplish a task. In such situations, it would be advantageous from a user experience standpoint for the user to be able to deactivate areas of the touch screen where he or she does not want touches to register.

Currently operation of a information handling device, including multi-media functions, may be controlled through the use of mechanical or touch capacitive buttons in an isolated area of an All-in-One (AIO) computer or a display of an information handling device. These solutions, however, become more complicated to use the more media functions are added to the information handling device (e.g., each new function needs a new button and icon to identify the location.

Accordingly, an embodiment provides for gestures to control an information handling device (e.g., control the multimedia functions). For example, multiple touch sensors may be embedded in the display bezel to allow a number of capabilities, e.g., a user turning a camera on/off by simply tapping the camera, a user muting a microphone by tapping the area of the device where the microphone(s) are located, a user muting a speaker by tapping the area of the device where the speakers are located, a user controlling volume by a swipe of the hand up/down along a side of the display, a user controlling camera up/down by a swipe of the hand up/down along a side of the display, and the like. It should be noted that control of any appropriate function of the information handling device may exercised, and those functions listed above are merely exemplary.

It should also be noted that embodiments are appropriate in where the display is not touch sensitive, but is surrounded by a bezel (e.g., a traditional display or monitor) and also where the display itself is touch sensitive and is there is a bezel portion of the display (which may or may not have the same touch sensitivity as the rest of the display). A bezel portion of the display is the portion of the display which is not used to display information to a user. For example, in a traditional display or monitor, the bezel portion surrounds the portion used to display information to a user, is made of opaque plastic, and may contain an on/off switch. In an AIO computer or a touch sensitive display, the bezel portion is a portion of the display adjacent to the physical edge of the device and which is not used to display information to a user.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additional devices 120 are commonly included. System 100 often includes a touch screen 170 for data input and display/rendering, e.g., receiving content and navigation inputs via a pen or stylus, as further described herein. System 100 also typically includes various memory devices, for example flash memory 180 and SDRAM 190.

Figure 2:
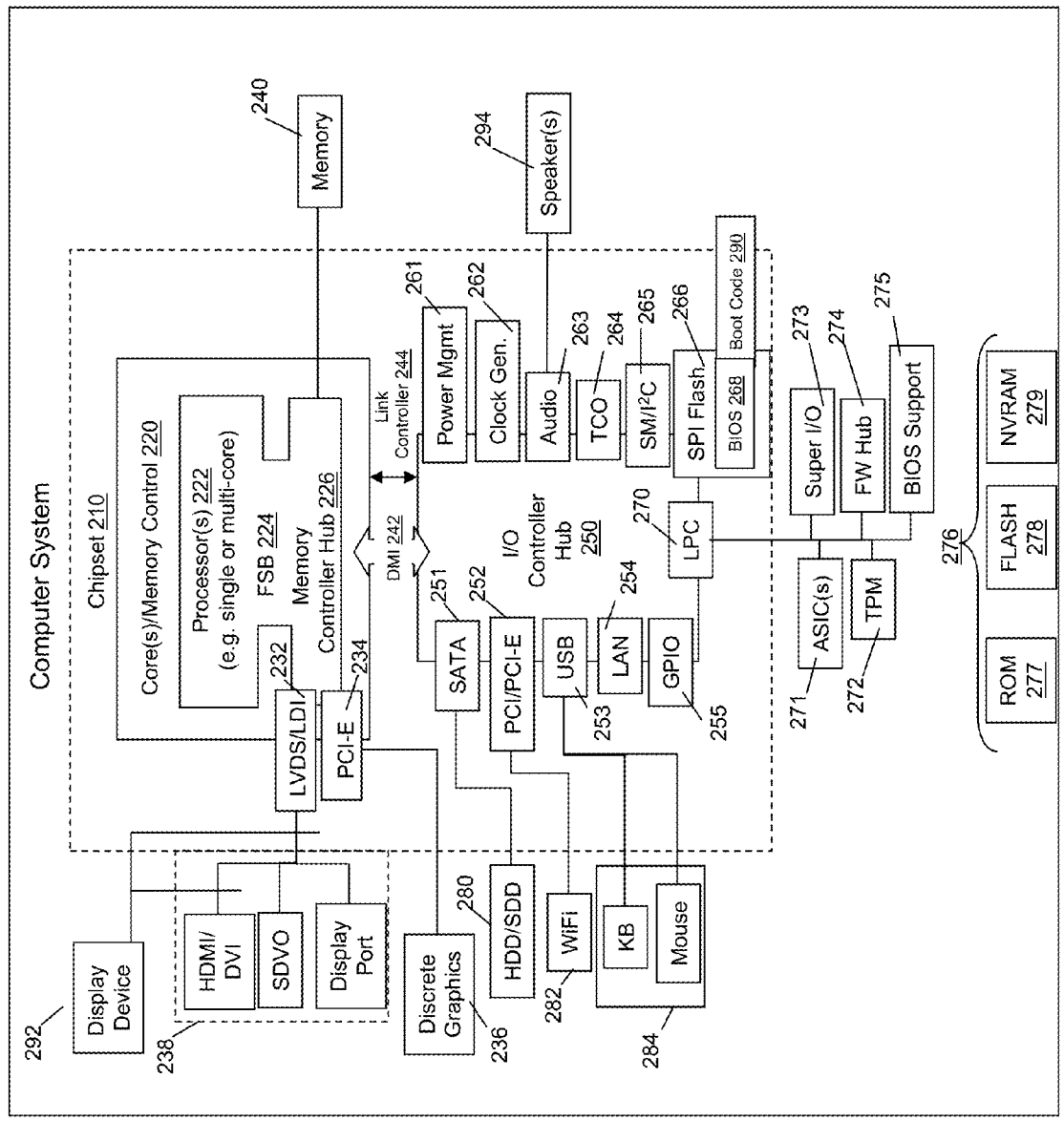
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (U.S.) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a LVDS interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be included in user devices that accept inputs to a touch sensitive surface such as a touch screen. An embodiment provides a user with the ability to selectively deactivate certain portions or areas of the touch screen using a variety of modalities, as described further herein. In an embodiment, rather than deactivating an entire touch screen, those area(s) not deactivated remain active and responsive to user touch inputs. The deactivated portions may be visible, e.g., continue to display content, and may also include an indication of the deactivation, e.g., a visual indication such as a slightly grayed out area.

Figure 3:
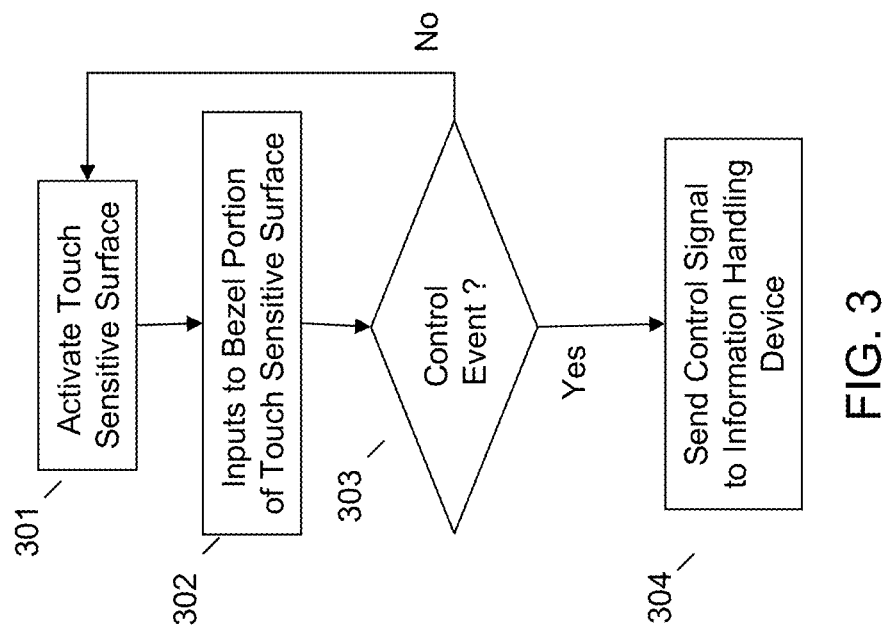
FIG. 3 illustrates an example of controlling an information handling device in accordance with an embodiment.

Referring to FIG. 3, an embodiment provides an active touch sensitive surface such as a touch screen at 301. The touch sensitive surface may thus accept user inputs to the bezel portion at 302. An embodiment may thereafter detect a control event at 303, e.g., a user supplied gesture such as a user selection of a portion of the bezel portion to designate an event, e.g., turning off the camera, adjusting the volume, etc. If such a control event is detected at 303, an embodiment may thereafter forward the appropriate control signal to the information handling device at 304, e.g., corresponding to the parameters of the control event.

Figure 4:
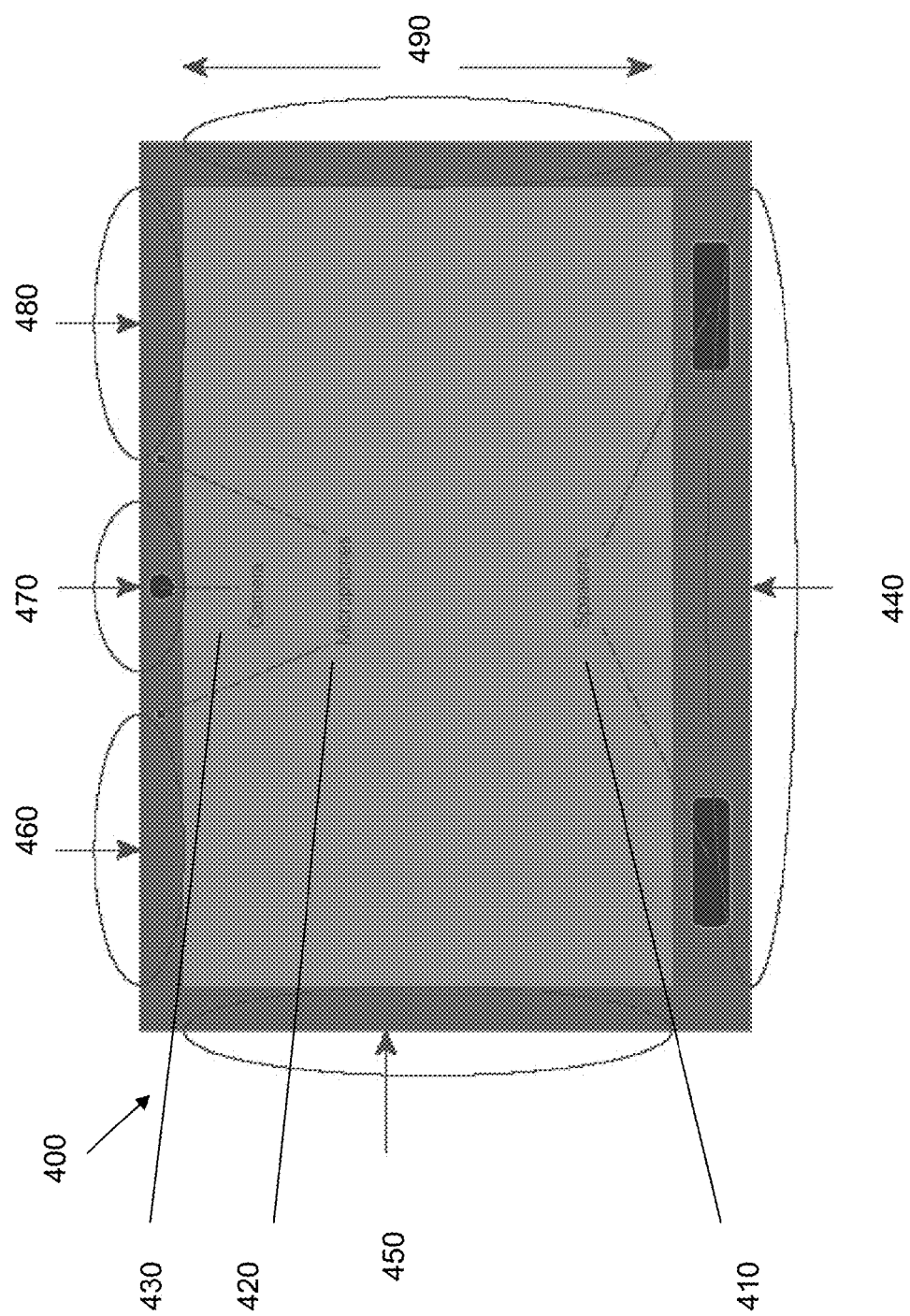
FIG. 4 illustrates an example of control areas of a display in accordance with an embodiment.

For example, an embodiment permits a user to control a number of functions of the information handling device operatively coupled to the display. As illustrated in FIG. 4 by way of example, a display 400 in accordance with an embodiment is shown. Integral elements of the display are shown, including speakers 410, microphones 420, and camera 430. Reference numeral 440 depicts an area near speakers 410 which may be used to control the volume of sound emanating the information handling device. For example, a user may tap area 440 for to mute the speakers.

A user may apply input to area 450 (tap or slide) to control a special function assigned to this area. A user may tap the left front top (area 460) to mute the microphones. Similarly, a user may tap the right front top (area 480) to mute the microphones. A user may also tap the front top (area 470) to turn the camera 430 on/off. A user may provide input on the right side bezel (area 490) to control the volume, e.g., by swiping up/down. In an embodiment, it is preferred that the control area is proximate to the device being controlled (e.g., as shown the control area for the camera is near the camera).

As described herein, the control event may comprise a user specific designation event. For example, user-specific restrictions in applications like games, etc., may be utilized. For example, a user-specific designation may be utilized such that user A may only interact with certain areas or objects on the bezel, but cannot edit or manipulate user B's settings.

Other possible applications of utilizing user specific designations may include but are not necessarily limited to designating areas in formatted documents, e.g., legal documents that require digital signatures, use in games or drawing programs where multiple users would be touching the screen at the same time, or drawing programs where it is often necessary for a user to rest his or her fingers or palm on the screen for added precision.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   activating, using a processor, a touch sensitive surface which comprises at least a bezel portion of a display, wherein said bezel portion does not display information and comprises said touch sensitive surface overlaying a hardware device selected from the group consisting of a camera, a microphone, and a speaker;
   accepting, using a processor, user input to the bezel portion of the touch sensitive surface, said user input selected from the group consisting of a tap and a swipe; and controlling, using a processor, the hardware device operatively coupled to the touch sensitive surface in response to the user input in the bezel portion of the display overlaying the hardware device;
wherein the controlling comprises activating the hardware device in response to the user input.

2. The method of claim 1, wherein the controlling comprises transferring a control signal based upon the touch input to an operating system of the information handling device.

3. The method of claim 2, wherein the control signal is the touch input.

4. The method of claim 1, wherein the controlling comprises controlling a multimedia function of the information handling device.

5. The method of claim 4, wherein the multimedia function being controlled is input selected from the group consisting of input from a camera, and input from a microphone, and volume of sound being outputted to a speaker.

6. The method of claim 5, wherein at least one of: the input from the microphone and the volume is muted.

7. The method of claim 1, wherein a plurality of touch sensors are embedded in the bezel portion of the display.

8. The method of claim 7, wherein the display comprises a touch sensitive surface.

9. The method of claim 1, wherein the user input is a swipe.

10. An information handling device, comprising:
a display;
one or more hardware devices;
a touch sensitive surface which comprises at least a bezel portion of the display wherein said bezel portion of the display does not display information;
a processor operatively coupled to the touch sensitive surface; and
a memory device that stores instructions accessible to the processor, the instructions being executable by the processor to:
activate the touch sensitive surface that comprises at least the bezel portion of the display;
accept user input to the bezel portion of the display, wherein said bezel portion comprises said touch sensitive surface overlaying a hardware device of the one or more hardware devices selected from the group consisting of a camera, a microphone, and a speaker;
said user input selected from the group consisting of a tap and a swipe; and
control at least one of the one or more hardware devices in response to the user input in the bezel portion of the display overlaying the at least one of the hardware devices;
wherein the control comprises activating the at least one of the hardware devices in response to the user input.

11. The information handling device of claim 10, wherein the control comprises transferring a control signal based upon the user input to an operating system of the information handling device.

12. The information handling device of claim 11, wherein the control signal is the user input.

13. The information handling device of claim 10, wherein at least one of the one or more hardware devices is selected from the group consisting of a camera, a speaker, a microphone, a volume control, and an antenna.

14. The information handling device of claim 10, wherein the control comprises controlling a multimedia function of the information handling device.

15. The information handling device of claim 14, wherein the multimedia function being controlled is input selected from the group consisting of input from a camera, input from a microphone, and volume of sound being outputted to a speaker.

16. The information handling device of claim 15, wherein at least one of: the input from the microphone and the volume is muted.

17. The information handling device of claim 10, wherein a plurality of touch sensors are embedded in the bezel portion of the display.

18. The information handling device of claim 17, wherein the display is a touch sensitive surface.

19. The information handling device of claim 10, wherein the touch sensitive surface is within a predetermined distance of at least one of the one or more hardware devices being controlled.

20. A product, comprising:
a non-signal storage device having code stored therewith, the code being executable by a processor and comprising:
code that activates a touch sensitive surface of an information handling device which comprises at least a bezel portion of a display, wherein said bezel portion does not display information and comprises said touch sensitive surface overlaying a hardware device selected from the group consisting of a camera, a microphone, and a speaker;
code that accepts user input to the bezel portion of the display, said user input selected from the group consisting of a tap and a swipe; and
code that controls at least one of the one or more hardware devices in response to the user input in the bezel portion of the display overlaying the hardware device;
wherein the control comprises activating the at least one of the hardware devices in response to the user input.

* * * * *